United States Patent [19]

Holzhäuser

[11] 4,429,781

[45] Feb. 7, 1984

[54] METHOD AND APPARATUS FOR SUPPLYING INDIVIDUAL ITEMS TO A CONVEYOR

[75] Inventor: Dieter Holzhäuser, Darmstadt, Fed. Rep. of Germany

[73] Assignee: Kosan Crisplant A/S, Aarhus N, Denmark

[21] Appl. No.: 212,709

[22] PCT Filed: Mar. 7, 1980

[86] PCT No.: PCT/DK80/00015

§ 371 Date: Nov. 10, 1980

§ 102(e) Date: Nov. 10, 1980

[87] PCT Pub. No.: WO80/01903

PCT Pub. Date: Sep. 18, 1980

[30] Foreign Application Priority Data

Mar. 9, 1979 [DE] Fed. Rep. of Germany ....... 2909292

[51] Int. Cl.³ .............................................. B65G 47/68
[52] U.S. Cl. .................................... 198/448; 198/357; 198/572; 198/577
[58] Field of Search ............... 198/357, 577, 444, 448, 198/572, 575, 601, 854–857; 414/134, 136

[56] References Cited

U.S. PATENT DOCUMENTS

| | | | |
|---|---|---|---|
| 1,939,184 | 12/1933 | Neuman | 198/357 |
| 2,901,083 | 8/1959 | McGrath | 198/357 |
| 3,485,339 | 12/1969 | Miller et al. | 198/577 X |
| 3,613,863 | 10/1971 | Hedrick | 198/448 X |
| 3,747,781 | 7/1973 | Daigle et al. | 198/357 X |
| 4,140,213 | 2/1979 | Denison | 198/857 X |

*Primary Examiner*—Joseph E. Valenza
*Attorney, Agent, or Firm*—Antonelli, Terry & Wands

[57] ABSTRACT

An apparatus for supplying individual items to a conveyor moving at an operating velocity has a loading device and a drive for varying the conveying speed of the loading device. The drive includes a controlling arrangement which varies the conveying speed of the loading device during conveying of an item on its conveying surface in a manner that the acceleration force resulting therefrom does not exceed the static friction force between the item located on the loading device and the conveying surface of the loading device so as to avoid overturning and sliding of the item. In accordance with the method of operating the apparatus, an item is loaded onto the conveying surface of the loading device and is accelerated from an initial velocity that has a speed component in a direction of conveyance of the conveyor which is substantially different from the operating velocity of the conveyor and then is accelerated to a velocity having substantially the same speed component in the direction of conveyance of the conveyor by changing the conveying speed of the loading device to an extent that does not overcome the static friction between the item on the conveying surface of the loading device and the conveying surface.

8 Claims, 3 Drawing Figures

METHOD AND APPARATUS FOR SUPPLYING INDIVIDUAL ITEMS TO A CONVEYOR

The invention relates to supplying individual items to a conveyor which may be a continuous conveyor wherein the individual item, after the process of being loaded on the continuous conveyor, is made to assume a predetermined geometrical position thereon, the original speed of the individual item, which may in an extreme situation be zero, differing substantially from the conveying speed of the continuous conveyor.

It is known to supply individual piece goods or items to a conveyor or a conveying apparatus or means which distributes the piece goods or items or which is intended to transport them in a specific sequence, when the speed of the individual item prior to supply differs substantially from the speed of the receiving conveyor or conveying apparatus, or means for example due to manual handling.

For the following reasons, a predetermined position is required during the conveying processes described:

1. In order to achieve maximum throughput of individual items, they must be placed on the receiving conveying apparatus in the closest possible relationship.
2. If the receiving conveying apparatus is so constructed that a specific carrier element is occupied by each individual item, then the individual item must be positioned in the predetermined location in respect of this carrier element.
3. Individual items must occupy a predetermined location on the receiving conveying means if the locations on the receiving conveying means were predetermined by a control system even prior to the individual items being received by the conveying means.

The predetermined location of the individual item on the receiving conveying means must be achieved with a variation in speed, as a rule an acceleration. The moment of commencement of this acceleration is triggered by a control signal synchronised to the conveying means which receives the item. Acceleration of the individual item can be effected by a positive application of force (a gripping, pushing or entraining means) or by frictional engagement of force (friction force between individual item and conveying means).

The positive application of force however has the disadvantage of requiring high mechanical cost and considerable space as in the case of the construction according to German Auslegeschrift No. 15 56 221, which is then further increased if the individual items are likely to be of extremely differing dimensions. Furthermore, the force applied in positive fashion to the individual item should as far as possible be so applied as to avoid the individual item being tipped over because, should this happen, it would be impossible adequately to ensure an accurate positioning of the individual item on the conveying means which is to receive it. If the receiving conveying means is left the task of providing the acceleration by positive engagement, then even at quite usual speeds, inadmissibly high impact forces may act upon the individual item which may for example prevent an accurate placement of the receiving conveying means.

The frictional application of force to the individual item is effected by the conveying means described at the outset in the first case in that the individual time is accelerated together with the conveying means and in the second case in that the conveying means runs constantly at a determined speed, the individual item being however, positively prevented from onwards movement until the moment of starting.

In the first case, prior art methods endeavour to carry out acceleration over the shortest possible distance, so that the maximum working frequency remains so high that every possible location on the receiving conveying means can be loaded by one and the same conveying means as described at the outset, or so that the distances between individual items are as small as possible.

It is thereby not entirely out of the question that the maximum possible frictional force between individual item and conveying means is exceeded, resulting in slipping, or that the acceleration force is so great that tipping over is initiated. These unacceptable factors remain tolerable only if the period of action of these forces and thus the acceleration time remains short.

Shortest possible acceleration path and short acceleration time impose limits on the speed to which it is possible to accelerate, for a given acceleration, i.e. the speed of the receiving conveying means is limited upwards in a range which is important to individual piece goods conveyance. This is a disadvantage because the speed determines the rate of throughput.

A further disadvantage is that the slipping and the initial stages of overturning give rise to inaccuracies in respect of the predetermined location of the individual item on the conveying means which is to receive it.

In the second case, the maximum possible friction force between individual item and conveying means is intentionally used to produce the acceleration, which means that slipping regularly occurs and the risk of overturning is already considerable for normal locations of the centre of gravity (e.g. that of a cube-shaped item). The disadvantages described for the first case are also applicable here.

The invention is based on the problem of providing an apparatus for supplying individual piece goods or times to a conveyor or conveying means, dispensing with positive application of force to the individual item, which neither slips nor overturns on the conveying means during the acceleration phase. In consequence, the individual item becomes accurately positioned on the receiving conveying means. At the same time, it is intended that there be no upper limit to the conveying speed of the receiving conveying means by reason of the manner in which individual items are fed to the conveying means.

According to one aspect of the invention there is provided a method apparatus for supplying individual items to a conveyor, the apparatus comprising a loading device and a drive for varying the conveying speed of the loading device, the method comprising controlling the conveying speed of the loading device during the actual conveying operation of the loading device only to the extent that the acceleration force resulting therefrom does not exceed the static friction force between an item located on the loading device and the conveying surface of the loading device.

According to another aspect of the invention there is provided an apparatus for supplying individual items to a conveyor, comprising a loading device and a drive for varying the conveying speed of the loading device, and means arranged for controlling the conveying speed of the loading device during the actual conveying operation of the loading device only to the extent that the acceleration force resulting therefrom does not exceed the static friction force between an item located on the loading device and the conveying surface of the loading device.

Advantageous further developments of the invention are described in the sub-claims.

Accelerations within the meaning of the invention may be positive or negative, in other words they may also constitute decelerations.

The advantages achieved by embodiments of the invention reside in particular in that the speed of a continuous conveyor such as for example the speed of a tilting pan conveyor system can be doubled in comparison with conventionally fed distribution systems so that the throughput can be increased to 7,200 items per hour in comparison for example with a possible 3,600 items per hour at a continuously operating conveyor speed of 1 m/s.

Thus, in conjunction with the prior art tilting pan technology, a spatially adaptable, destination-controlled technically simple distribution system is provided which has a high distribution output in comparison with the hitherto available straight-section destination-controlled distribution systems which had a lower throughput (flat belt, tilting link belts) and which involved greater technical complication and cost (tilting link belts).

Since embodiments of this invention do not necessarily seek to accelerate individual piece goods as rapidly as possible, it is not always possible to reach every possible location on the receiving continuously operating conveyor. In contrast to the earlier assumption, this is not necessary because the working frequency need only be as great as the frequency at which the conveyor is loaded. The time required for acceleration is taken into account by a control system when the signal to commence acceleration is given.

Embodiments of the invention will now be described by way of example with reference to the accompanying drawings, in which.

Figure 1:
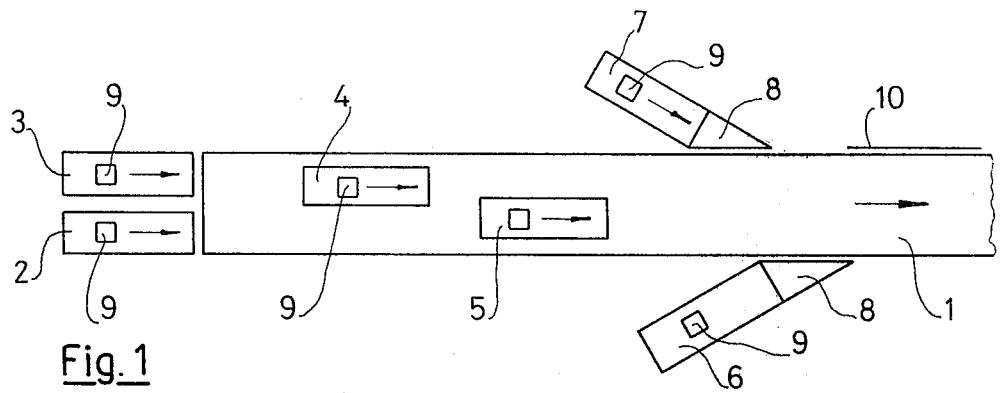
FIG. 1 shows various possible locations of an apparatus according to the invention; in conjunction with a continuously operating conveyor.

FIG. 1 shows the receiving continuously operating conveyor 1 which in this example is shown as a belt conveyor and six different possible locations of the loading apparatuses which are likewise constructed as belt conveyors. The loading apparatus 2 and the loading apparatus 3 are disposed upstream of and the loading apparatus 4 and loading apparatus 5 are disposed above the receiving continuous conveyor 1. The direction of movement of the individual piece goods 9 after acceleration by one of the four loading apparatuses 2,3,4 or 5 is in these cases the same as or parallel with the direction of conveyance of the continuous conveyor 1 or forms a negligibly small angle therewith.

If the final speed of the individual items 9 after acceleration is equal to the conveying speed of the continuous conveyor 1, then the result will be no or only very minor undesired speed components in the individual items 9.

In the case of the loading apparatus 6 and loading apparatus 7, as a result of the relatively considerable angle between the directions of acceleration and conveyance respectively and the direction of conveyance of the continuous conveyor 1, greater undesired speed components on the part of the individual items 9 will occur transversely of the direction of conveyance of the continuous conveyor 1. If these speed components are so great that the individual item 9 were to leave the conveying area of the continuous conveyor 1, then suitable aids such as a deflector or baffle 10 could render such speed component ineffectual.

A so-called loading triangle 8 may be constructed as a small roller, roller or belt conveyor. If the conveying elements of the loading triangle 8 are driven, then the conveying speed of these conveying elements must be equal to the final speed of the individual item 9 on the loading apparatus 6 or 7. There is also opportunity for not having these conveying elements driven but of making them easily running so that they offer only negligible resistance to the individual item 9.

Figure 2:
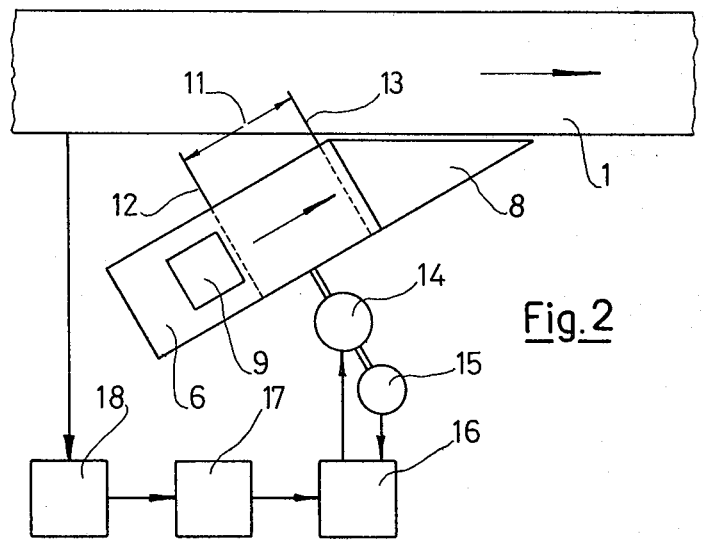
FIG. 2 shows a first embodiment of a loading apparatus with a speed regulated drive and the necessary control devices.

FIG. 2 shows as an example the loading apparatus 6 which has a drive and control system and which is disposed laterally of the continuous conveyor 1.

The individual item 9, prior to the acceleration process, is positioned on the loading apparatus 6 with its edge which defines the geometrical position on the continuous conveyor 1 located on a starting line 12. When the acceleration process is triggered, the individual item 9 is, within the acceleration path 11, caused to undergo controlled acceleration to the final speed and is conveyed from the end 13 of the acceleration path at a constant final speed via the loading triangle 8 to the continuous conveyor 1. The final speed of the individual item 9 must be sufficiently great that the speed component in the conveying direction of the continuous conveyor 1 is equal to the conveying speed of the continuous conveyor 1.

A drive system with control circuits is already known in other fields of engineering as a 4-quadrant motor control system. This motor control system comprises a regulated drive 14, an actual rotary speed transmitter 15, a rotary speed regular 16 and a desired value transmitter 17.

After the individual item 9 has been positioned on the starting line 12, the acceleration process is triggered by the control system 18 which is responsive to the speed of the continuous conveyor 1 or the envisaged location of the individual item 9 on the continuous conveyor 1.

The desired acceleration is achieved by automatic variation of the desired value inside the desired value transmitter 17. When adjusting the desired value transmitter, care must be taken to ensure that, during the acceleration phase, the individual item 9 neither slips nor overturns as otherwise accurate location of the individual item 9 on the continuous conveyor 1 is not guaranteed.

Since, as a result of the motor control system, positive and negative acceleration properties of the loading apparatus 6 are identical, the motor control system is also used during positioning of the individual items 9. This ensures that even if the mass of the individual items 9 differs considerably from one item to the next, they will always be positioned exactly on the starting line 12.

Figure 3:
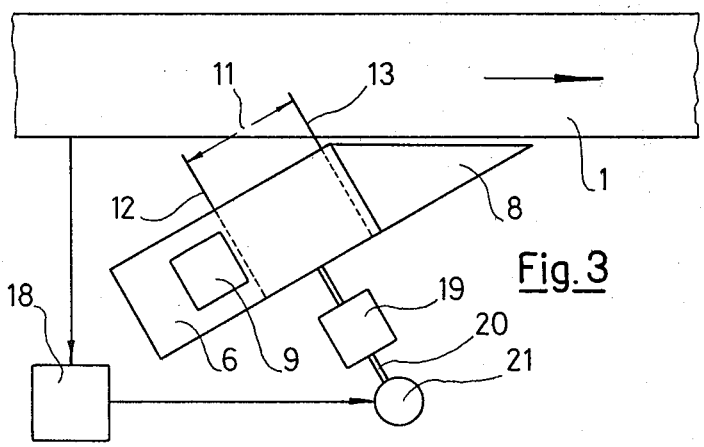
FIG. 3 shows a further embodiment of a loading apparatus with a drive derived from a non-controlled drive source.

FIG. 3 shows a further embodiment of the invention. A drive derived from a non-controlled drive source 21 accelerates the individual item 9 on the loading apparatus 6.

An even (controlled) acceleration within the acceleration path 11 is in this case achieved by a torque-limited component 19 such as for example a slipper coupling on the drive shaft 20. This embodiment is important only if the individual items 9 are as far as possible of equal weight. Here, too, the control system 18 triggers the acceleration process once the individual item 9 has been positioned on the starting line 12. With effect from the end 13 of the acceleration path, the individual item 9 is conveyed onwardly at a constant speed via the filling triangle 8 and is taken over by the continuous conveyor 1.

The choice of drive is substantially open, since not only rotary drives but also linear drives or electric or hydraulic drives may be used in conjunction with the motor control system or the force limiting or torque limiting component. It is also possible to use stepping drives.

I claim:

1. A method of operating an apparatus for supplying individual items to a conveyor moving at an operating velocity, said apparatus having a loading device and a drive for varying the conveying speed of the loading device, comprising the steps of:
    (A) delivering an item onto a conveying surface of the loading device; and
    (B) accelerating said item from an initial velocity on said loading device, that has a speed component in a direction of conveyance of the conveyor which is substantially different from said operating velocity of the conveyor, to substantially the same speed component in the direction of conveyance of the conveyor as the conveyor by a controlled adjustment of the conveying speed of the loading device in a manner in which the acceleration of the item on the conveyor does not produce overturning thereof and does not overcome the static friction between the item on the conveying surface of the loading device and said conveying surface, whereby sliding of the item is avoided.

2. A method according to claim 1, wherein the conveyor is a continuous conveyor and wherein the individual item, after being loaded onto the continuous conveyor, is made to assume a predetermined geometrical position thereon.

3. A method according to claim 1 or 2, wherein said initial velocity of the individual item is zero.

4. A method according to claim 1, wherein, during said accelerating step, each individual item is accelerated along a predetermined acceleration path from a predetermined starting line on which, prior to the acceleration process, that edge of the individual item which determines a geometrical location of the item on the conveyor is positioned, and wherein the individual item is accelerated along the acceleration path to a speed having a speed component in the direction of conveyance of the conveyor equal to the conveying speed of the conveyor.

5. An apparatus for supplying individual items to a conveyor by accelerating an item from an initial velocity on the apparatus that has a speed component in a direction of conveyance of the conveyor that is substantially different from the operating velocity of the conveyor, comprising a loading device with a conveying surface and a drive for varying the conveying speed of the loading device, said drive including means arranged for producing a controlled adjustment of the conveying speed of the loading device, during conveying of an item on the conveying surface of the loading device, in a manner that the the acceleration of the item on the conveying surface does not produce overturning and does not exceed the static friction force between the item located on the loading device and the conveying surface of the loading device, so as to avoid sliding of the item.

6. An apparatus according to claim 5, wherein the drive for the loading device is a speed regulated or controlled drive, and wherein a 4-quadrant motor control system is provided on the controlled drive and comprises an actual rotary speed transmitter, a speed regulator and a desired value transmitter, the desired acceleration variation being achieved by automatic variation of the desired value inside the desired value transmitter during the conveying of the items on the conveying surface of the loading device.

7. An apparatus according to claim 5, wherein the drive comprises a non-regulated drive source, the driving power of which is transmitted to the loading device via a power or torque limiting component.

8. An apparatus according to claim 5, wherein a predetermined acceleration section is defined on said conveying surface, along which acceleration of the individual item occurs in use between a predetermined starting line on which, prior to said acceleration of the item, that edge of the individual item which determines its geometrical location on the conveyor is in use positioned, and an end by which, in use, the acceleration is completed and the velocity of the individual item is constant and its speed component in the direction of conveyance of the conveyor is equal to the operating velocity of the conveyor.

* * * * *